Z

(12) United States Patent
Holland

(10) Patent No.: US 9,736,258 B2
(45) Date of Patent: *Aug. 15, 2017

(54) ASSESSMENT OF CONTENT DELIVERY SERVICES USING PERFORMANCE MEASUREMENTS FROM WITHIN AN END USER CLIENT APPLICATION

(71) Applicant: Akamai Technologies, Inc., Cambridge, MA (US)

(72) Inventor: Mark C. Holland, Beverly, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/261,026

(22) Filed: Sep. 9, 2016

(65) Prior Publication Data

US 2016/0381166 A1    Dec. 29, 2016

Related U.S. Application Data

(63) Continuation of application No. 13/720,636, filed on Dec. 19, 2012.

(Continued)

(51) Int. Cl.
*H04L 29/08* (2006.01)
*H04L 12/24* (2006.01)
(Continued)

(52) U.S. Cl.
CPC ...... *H04L 67/2804* (2013.01); *G06F 11/3006* (2013.01); *G06F 11/3419* (2013.01);
(Continued)

(58) Field of Classification Search
CPC ............. G06F 11/3006; G06F 11/3419; G06F 11/3495; G06F 11/3476; G06F 2201/785;
(Continued)

(56) References Cited

U.S. PATENT DOCUMENTS 6,397,217 B1   5/2002   Melbin et al.
7,752,258 B2   7/2010   Lewin et al.
(Continued)

OTHER PUBLICATIONS

U.S. Appl. No. 13/720,636, available in USPTO file system.
(Continued)

*Primary Examiner* — Arvin Eskandarnia
*Assistant Examiner* — Gil H. Lee

(57) ABSTRACT

A system for measuring and monitoring performance of online content is provided. In one embodiment, the system includes an intermediary device, such as a web proxy, that receives client requests for content, such as requests for web pages. The device obtains the requested content, modifies it by applying one or more performance optimizations, and serves it to the client. The device also inserts code into the content for execution by the client to gather and report data reflecting, e.g., how quickly the client is able to get and process the content. The code includes information identifying the modifications the device made, and this is reported with the timing data, so that the effect on performance can be analyzed. In other embodiments, the device selects one of multiple versions of content, and the inserted code contains information identifying the selected version. The foregoing are merely examples; other embodiments are described herein.

3 Claims, 6 Drawing Sheets

Related U.S. Application Data

(60) Provisional application No. 61/579,674, filed on Dec. 23, 2011.

(51) Int. Cl.
  *G06F 11/34* (2006.01)
  *G06F 11/30* (2006.01)

(52) U.S. Cl.
  CPC ...... *G06F 11/3476* (2013.01); *G06F 11/3495* (2013.01); *H04L 41/14* (2013.01); *H04L 67/22* (2013.01); *H04L 67/2842* (2013.01); *H04L 67/34* (2013.01); *G06F 2201/875* (2013.01); *H04L 67/02* (2013.01); *H04L 67/2823* (2013.01)

(58) Field of Classification Search
  CPC . H04L 67/02; H04L 67/2804; H04L 67/2842; H04L 67/34; H04L 41/14; H04L 67/22; H04L 67/2823
  See application file for complete search history.

(56) References Cited

U.S. PATENT DOCUMENTS

| | | | |
|---|---|---|---|
| 7,844,036 | B2 | 11/2010 | Gardner et al. |
| 7,886,218 | B2 | 2/2011 | Watson et al. |
| 8,306,195 | B2 | 11/2012 | Gardner et al. |
| 8,341,462 | B2 | 12/2012 | Broda et al. |
| 8,447,837 | B2 | 5/2013 | Devanneaux et al. |
| 8,489,923 | B1 | 7/2013 | Lakshminarayanan et al. |
| 8,510,600 | B2 | 8/2013 | Broda et al. |
| 8,626,910 | B1 | 1/2014 | Lientz |
| 8,738,766 | B1 | 5/2014 | Kazerani et al. |
| 8,856,263 | B2 | 10/2014 | Fainberg et al. |
| 8,874,964 | B1 | 10/2014 | Lakshminarayanan et al. |
| 9,015,348 | B2 | 4/2015 | Hofmann et al. |
| 9,021,362 | B2 | 4/2015 | Tellis et al. |
| 9,055,466 | B2 | 6/2015 | Raghunath et al. |
| 9,106,607 | B1 | 8/2015 | Lepeska et al. |
| 9,154,611 | B1 | 10/2015 | Jackson et al. |
| 9,203,913 | B1 | 12/2015 | Pappu et al. |
| 9,229,842 | B2 | 1/2016 | Broda et al. |
| 9,239,750 | B1 | 1/2016 | Lakshminarayanan et al. |
| 9,251,035 | B1 | 2/2016 | Vazac et al. |
| 9,384,121 | B2 | 7/2016 | Jackson et al. |
| 9,436,579 | B2 | 9/2016 | Hemmert et al. |
| 9,450,834 | B2 | 9/2016 | Gardner et al. |
| 9,491,248 | B2 | 11/2016 | Broda et al. |
| 9,495,473 | B2 | 11/2016 | Gardner et al. |
| 2001/0047394 | A1 | 11/2001 | Kloba et al. |
| 2003/0130982 | A1 | 7/2003 | Kasriel et al. |
| 2005/0050000 | A1 | 3/2005 | Kwok et al. |
| 2005/0204276 | A1 | 9/2005 | Hosea et al. |
| 2007/0271375 | A1* | 11/2007 | Hwang ............... G06F 11/3419 709/224 |
| 2008/0049641 | A1 | 2/2008 | Edwards et al. |
| 2008/0065980 | A1* | 3/2008 | Hedbor ............ G06F 17/30905 715/234 |
| 2008/0071857 | A1 | 3/2008 | Lie et al. |
| 2008/0098093 | A1 | 4/2008 | Simon et al. |
| 2008/0104231 | A1* | 5/2008 | Dey .................... H04L 43/106 709/224 |
| 2008/0120434 | A1 | 5/2008 | Alstad |
| 2008/0228920 | A1 | 9/2008 | Souders et al. |
| 2008/0281798 | A1 | 11/2008 | Chatterjee et al. |
| 2008/0306816 | A1 | 12/2008 | Matthys et al. |
| 2009/0254707 | A1 | 10/2009 | Alstad et al. |
| 2009/0276488 | A1 | 11/2009 | Alstad et al. |
| 2009/0292824 | A1 | 11/2009 | Marashi et al. |
| 2010/0050089 | A1 | 2/2010 | Kim et al. |
| 2010/0324989 | A1 | 12/2010 | Etchegoyen et al. |
| 2011/0137973 | A1 | 6/2011 | Wei et al. |
| 2011/0191465 | A1 | 8/2011 | Hofstaedter et al. |
| 2011/0282997 | A1 | 11/2011 | Prince et al. |
| 2012/0166574 | A1* | 6/2012 | Harvell ................. G06F 15/167 709/217 |
| 2013/0097307 | A1 | 4/2013 | Vazac et al. |
| 2013/0166634 | A1 | 6/2013 | Holland |
| 2013/0219024 | A1 | 8/2013 | Flack et al. |
| 2013/0227078 | A1 | 8/2013 | Wei et al. |
| 2014/0280880 | A1 | 9/2014 | Tellis et al. |
| 2014/0303934 | A1 | 10/2014 | Mylarappa et al. |
| 2015/0067527 | A1 | 3/2015 | Gardner et al. |
| 2015/0088968 | A1 | 3/2015 | Wei et al. |
| 2015/0088969 | A1 | 3/2015 | Wei et al. |
| 2015/0088970 | A1 | 3/2015 | Wei et al. |
| 2015/0095471 | A1 | 4/2015 | Taneja et al. |

OTHER PUBLICATIONS

Notice of Allowance, for U.S. Appl. No. 13/946,777 (now U.S. Pat. No. 9,015,348), dated Dec. 16, 2014, 18 pages.

Case IPR2017-00377, Petition for Inter Partes Review of U.S. Pat. No. 9,015,348 Challenging Claim 1 Under 35 U.S.C. § 312 and 37 C.F.R § 42.104 Dec. 2, 2016, 291 pages including Exhibits 1001-1006.

Case IPR2017-00377, Patent Owner's Preliminary Response, Mar. 17, 2017, 87 pages including Exhibits 2001-2002.

Case IPR2017-00377, Decision Denying Institution of Inter Partes Review, 37 C.F.R. § 42.108, Jun. 13, 2017, 22 pages.

Buyya, Rajkumar et al., "Content Delivery Networks, Lecture Notes in Electrical Engineering, vol. 9", Springer, 2008, 429 pages, see entire text including (without limitation) Section 5.3.2 and p. 134.

Drai, David, "How to Optimize Website Content Delivery Using Whole-Site Acceleration", eWeek web page, Jul. 23 2010, 3 pages, downloaded Sep. 23, 2016 from http://www.eweek.com/c/a/Enterprise-Applications/How-to-Optimize-Website-Content-Delivery-Using-WholeSite-Acceleration.

First Action Interview, Office Action Summary, for U.S. Appl. No. 13/946,777, now U.S. Pat. No. 9,015,348, dated Mar. 31, 2014, 2 pages.

Interview Summary, for U.S. Appl. No. 13/946,777, now U.S. Pat. No. 9,015,348, dated Mar. 31, 2014, 5 pages.

Notice of Allowance, for U.S. Appl. No. 13/946,777 (now U.S. Pat. No. 9015348), dated Dec. 16, 2014, 18 pages.

Office Action, First Action Interview Pilot Program, for U.S. Appl. No. 13/946,777, now U.S. Pat. No. 9,015,348, dated Dec. 2, 2013, 5 pages.

Trasatti, Andrea, Measuring the speed of resource loading with JavaScript and HTML5 : Andrea Trasatti's tech notes and more, web article posted date Dec. 10, 2012 and published at http://blog.trasatti.it/2012/12/measuringthespeedofresourceloadingwithjavascriptandhtml5.html, (downloaded Feb. 2, 2016), 11 pages.

\* cited by examiner

ASSESSMENT OF CONTENT DELIVERY SERVICES USING PERFORMANCE MEASUREMENTS FROM WITHIN AN END USER CLIENT APPLICATION

CROSS-REFERENCE TO RELATED APPLICATIONS

This application is a continuation of U.S. application Ser. No. 13/720,636, filed Dec. 19, 2012, which claims the benefit of priority of U.S. Provisional Application No. 61/579,674, filed Dec. 23, 2011, the teachings of both of which are hereby incorporated by reference in their entireties.

This patent document contains material that is subject to copyright protection. The copyright owner has no objection to the facsimile reproduction by anyone of this patent document, as it appears in Patent and Trademark Office file or records, but otherwise reserves all copyright rights whatsoever.

BACKGROUND

Technical Field

This application relates generally to distributed data processing systems and to the delivery of content to end users over computer networks, and more particularly to the measurement and assessment of content delivery services.

Brief Description of the Related Art

Distributed computer systems are well-known in the prior art. One such distributed computer system is a "content delivery network" or "CDN" that is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" refers to the storage, caching, or transmission of content—such as web pages, streaming media and applications—on behalf of content providers, and ancillary technologies used therewith including, without limitation, DNS query handling, provisioning, data monitoring and reporting, content targeting, personalization, and business intelligence.

In a known system such as that shown in FIG. 1, a distributed computer system 100 is configured as a content delivery network (CDN) and is assumed to have a set of machines 102 distributed around the Internet. Typically, most of the machines are content servers located near the edge of the Internet, i.e., at or adjacent end user access networks. A network operations command center (NOCC) 104 may be used to administer and manage operations of the various machines in the system. Third party sites affiliated with content providers, such as web site 106, offload delivery of content (e.g., HTML, embedded page objects, streaming media, software downloads, and the like) to the distributed computer system 100 and, in particular, to the servers (which are sometimes referred to as proxy servers if running a proxy application as described below, or sometimes as "edge" servers in light of the possibility that they are near an "edge" of the Internet). Such servers may be grouped together into a point of presence (POP) 107.

Typically, content providers offload their content delivery by aliasing (e.g., by a DNS CNAME) given content provider domains or sub-domains to domains that are managed by the service provider's authoritative domain name service. End user client machines 122 that desire such content may be directed to the distributed computer system to obtain that content more reliably and efficiently. The servers respond to the client requests, for example by obtaining requested content from a local cache, from another content server, from the origin server 106, or other source.

Although not shown in detail in FIG. 1, the distributed computer system may also include other infrastructure, such as a distributed data collection system 108 that collects usage and other data from the content servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the servers.

As illustrated in FIG. 2, a given machine 200 in the CDN (sometimes referred to as an "edge machine") comprises commodity hardware (e.g., an Intel processor) 202 running an operating system kernel (such as Linux® or variant) 204 that supports one or more applications 206a-n. To facilitate content delivery services, for example, given machines typically run a set of applications, such as an HTTP proxy 207, a name server 208, a local monitoring process 210, a distributed data collection process 212, and the like. The HTTP proxy 207 (sometimes referred to herein as a global host or "ghost" application) typically includes a manager process for managing a cache and delivery of content from the machine. For streaming media, the machine typically includes one or more media servers, such as a Windows® Media Server (WMS) or Flash® 2.0 server, as required by the supported media formats.

The machine 200 shown in FIG. 2 may be configured to provide one or more extended content delivery features, preferably on a domain-specific, content-provider-specific basis, preferably using configuration files that are distributed to the content servers using a configuration system. A given configuration file preferably is XML-based and includes a set of content handling rules and directives that facilitate one or more advanced content handling features. The configuration file may be delivered to the servers via the data transport mechanism. U.S. Pat. Nos. 7,111,057 and 7,240,100 illustrate a useful infrastructure for delivering and managing CDN server content control information and this and other content server control information (sometimes referred to as "metadata") can be provisioned by the CDN service provider itself, or (via an extranet or the like) the content provider customer who operates the origin server.

The CDN may include a network storage subsystem for the content providers to store and originate content (sometimes referred to herein as "NetStorage") which may be located in a network datacenter accessible to the content servers, such as described in U.S. Pat. No. 7,472,178, the disclosure of which is incorporated herein by reference. For live streaming delivery, the CDN may include a live delivery subsystem, such as described in U.S. Pat. No. 7,296,082, and U.S. Publication No. 2011/0173345, the disclosures of which are incorporated herein by reference.

As an overlay, the CDN resources may be used to facilitate wide area network (WAN) acceleration services between enterprise data centers (which may be privately managed) and third party software-as-a-service (SaaS) providers.

Given the ability to configure the CDN servers described above, a wide variety of content delivery features may be implemented in the CDN platform generally and by the CDN servers specifically. For example, a server may be configured to apply modifications to a given web page as it traverses the server (e.g., going from an origin/source to an end-user client) so as to reduce the number of requests the client has to make, to reduce the payload of the content, to accelerate client application processing/rendering, to tailor the content for a particular client device (and its capabilities), or otherwise enhance the performance and functionality of the content. A wide variety of such treatments are known in the art and often referred to as 'front-end' web optimizations or as 'web content' optimizations.

By way of example, U.S. Publication No. 2011/0314091 describes systems and methods for applying performance-enhancing modifications to web pages, and teachings of this publication are hereby incorporated by reference herein. A dynamic image delivery system is described in U.S. Pat. No. 8,060,581, the content of which are hereby incorporated by reference. U.S. Patent Publication No. 2012/0265853 and U.S. Patent Publication No. 2012/0259942 describes systems and methods for streaming media and for executing a byte-based interpreter in a proxy server that can be used to modify content, to add rights management information and/or watermarks and the like. The content of all of the foregoing patent documents are hereby incorporated by reference in their entireties.

Other performance-enhancing aspects of the CDN platform relate to the ability to intelligently map end-user clients to servers, and to the ability to intelligently route and manage the transmission of content across the network. For example, the CDN may operate a cache hierarchy to provide intermediate caching of customer content; one such cache hierarchy subsystem is described in U.S. Pat. No. 7,376,716, the disclosure of which is incorporated herein by reference. A transport and routing mechanism for arbitrary data flows is described in U.S. Pat. No. 7,660,296, the disclosure of which is hereby incorporated by reference. A system and method for delivery of content using intermediate nodes to facilitate content delivery is described in U.S. Pat. No. 6,820,133, the content of which are hereby incorporated by reference. A global hosting system that can utilize a network map is described in U.S. Pat. No. 6,108,703, the contents of which are hereby incorporated by reference.

There are many ways to measure the performance of web pages (and of a CDN) in a general sense, be it using synthetic monitoring or so-called real-user monitoring from within a browser. However, current performance measurement approaches are limited. It would be desirable to be able to better show the value of individual features or enhancements offered by a CDN on page performance. Furthermore, it is desirable to improve the ability to identify and address performance issues that may be affecting particular features or particular aspects of the CDN platform, or particular kinds of end-user clients (particular browsers or other client applications or particular devices) served by the CDN, or particular combinations of the foregoing. The teachings herein address such needs and offers and other benefits and advantages that will become clear in view of this disclosure.

BRIEF SUMMARY

This disclosure describes, among other things, a performance monitoring and measurement system which may be implemented within a CDN. In one embodiment, the system includes an intermediary device, such as a web proxy server, that receives requests for content from clients, such as requests for a web page. The intermediary device obtains the requested content, modifies it (e.g., by applying one or more performance-enhancing optimizations), and serves the modified content to the client. Though not limiting, the modifications are typically products and/or features offered by a service provider managing the intermediary device and/or a content delivery network (CDN) of which the device is a part. Continuing the example, the device also inserts code into the content that will be executed by the client so as to cause the client to gather timing data reflecting how quickly the client gets and is able to process the content for the end-user, and to report that data back to a back-end processing system. The code further includes information identifying the modifications that the intermediary device made. This information is included in the reported data, so that the effect of the modification(s) on performance can be analyzed. The back-end processing system receives the data and processes it so that it can be viewed in a user interface (e.g., visualized in various ways to show the performance improvements associated with the performance features provided by the service provider), analyzed by CDN service provider personnel, and/or fed into mapping/configuration systems in order to tune the operation of the device and the CDN.

In other embodiments, rather than making modifications to the content, the intermediary device can select one of multiple versions of content, and the inserted code can contain information identifying the selected content version, so that performance data can be correlated with content versions selected by the intermediary. In other embodiments, the intermediary device can send the content with or without modification, and the inserted code can contain information relating to or identify the intermediary device, devices from which the intermediary device obtained the content, or information about the client (e.g., characteristics of the client device, etc.), so that performance data can be correlated with these factors.

As those skilled in the art will recognize, the foregoing merely refers to examples provided for purposes of overview and introduction. They do not represent all possible variants or embodiments. Other embodiments are described below. The foregoing is not limiting, and the teachings hereof may be realized in a variety of systems, methods, apparatus, and non-transitory computer-readable media. The appended claims define the subject matter for which protection is sought. It should also be noted that the allocation of functions to particular machines is not limiting, as the functions recited herein may be combined or allocated amongst different machines in a variety of ways.

BRIEF DESCRIPTION OF THE DRAWINGS

The disclosure will be more fully understood from the following detailed description taken in conjunction with the accompanying drawings, in which.

DETAILED DESCRIPTION OF EMBODIMENTS

The following description sets forth embodiments of the invention to provide an overall understanding of the principles of the structure, function, manufacture, and use of the subject matter disclosed herein. The systems, methods and apparatus described herein and illustrated in the accompanying drawings are non-limiting examples; the scope of the invention is defined solely by the claims. The features described or illustrated in connection with one exemplary embodiment may be combined with the features of other embodiments. Such modifications and variations are intended to be included within the scope of the present invention. All patents, publications and references cited herein are expressly incorporated herein by reference in their entirety.

1.0 Performance Measurement and Monitoring System

Figure 1:
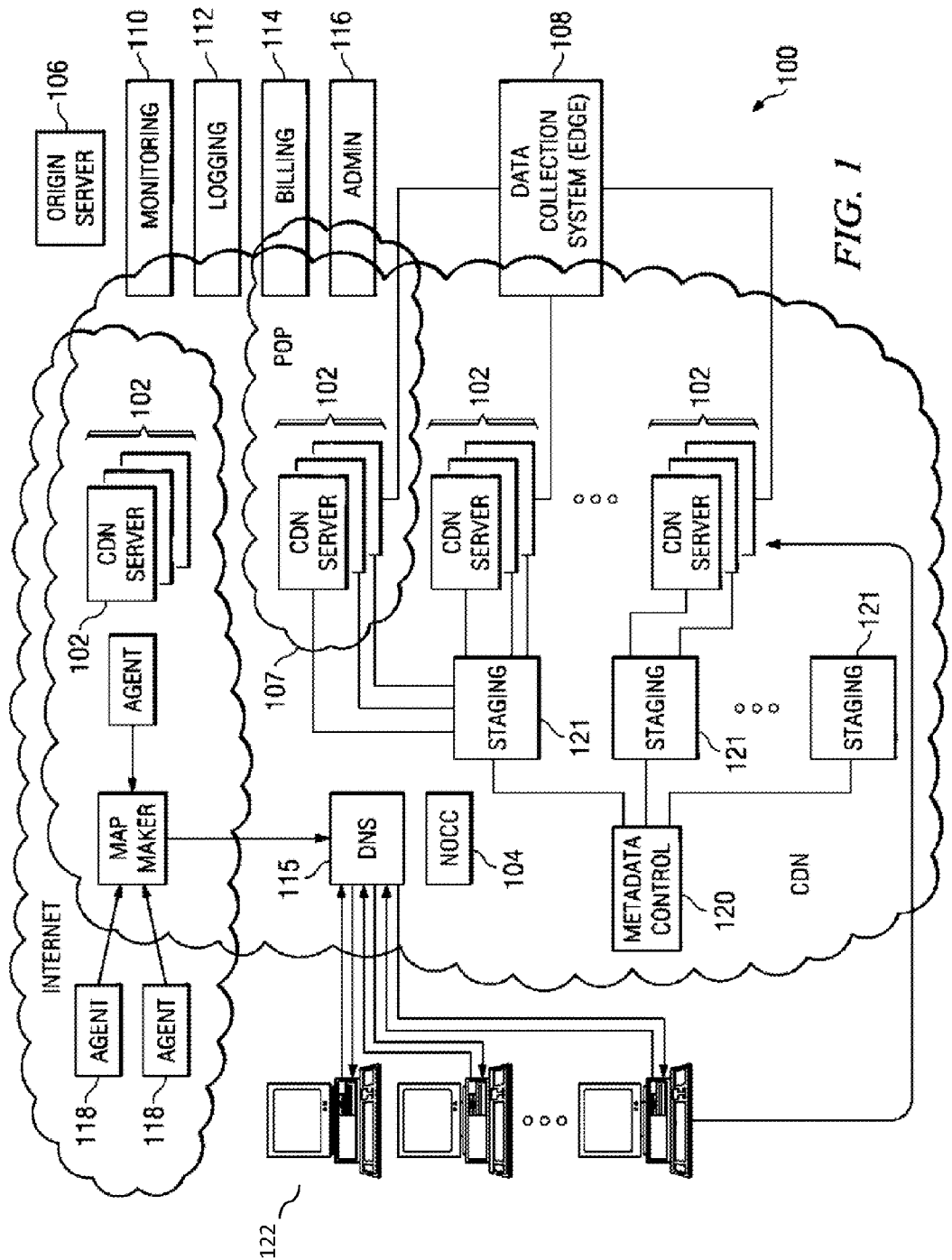
FIG. 1 is a schematic diagram illustrating one embodiment of a known distributed computer system configured as a content delivery network.
Figure 2:
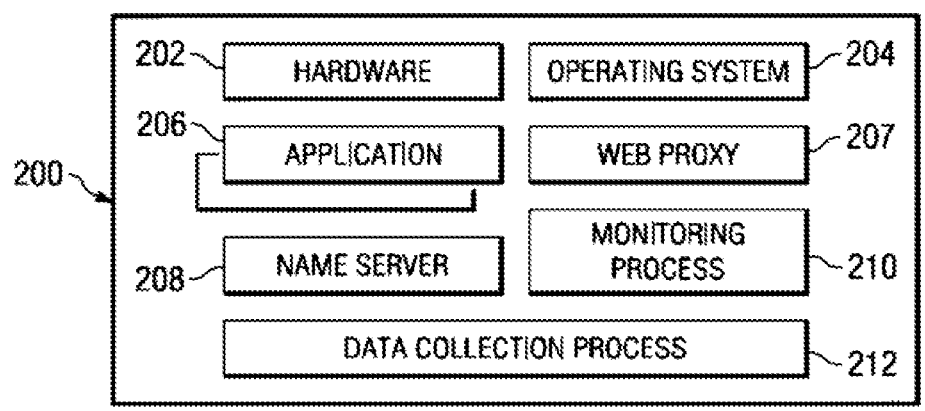
FIG. 2 is a schematic diagram illustrating one embodiment of a machine on which a content server in the system of FIG. 1 can be implemented.
Figure 3:
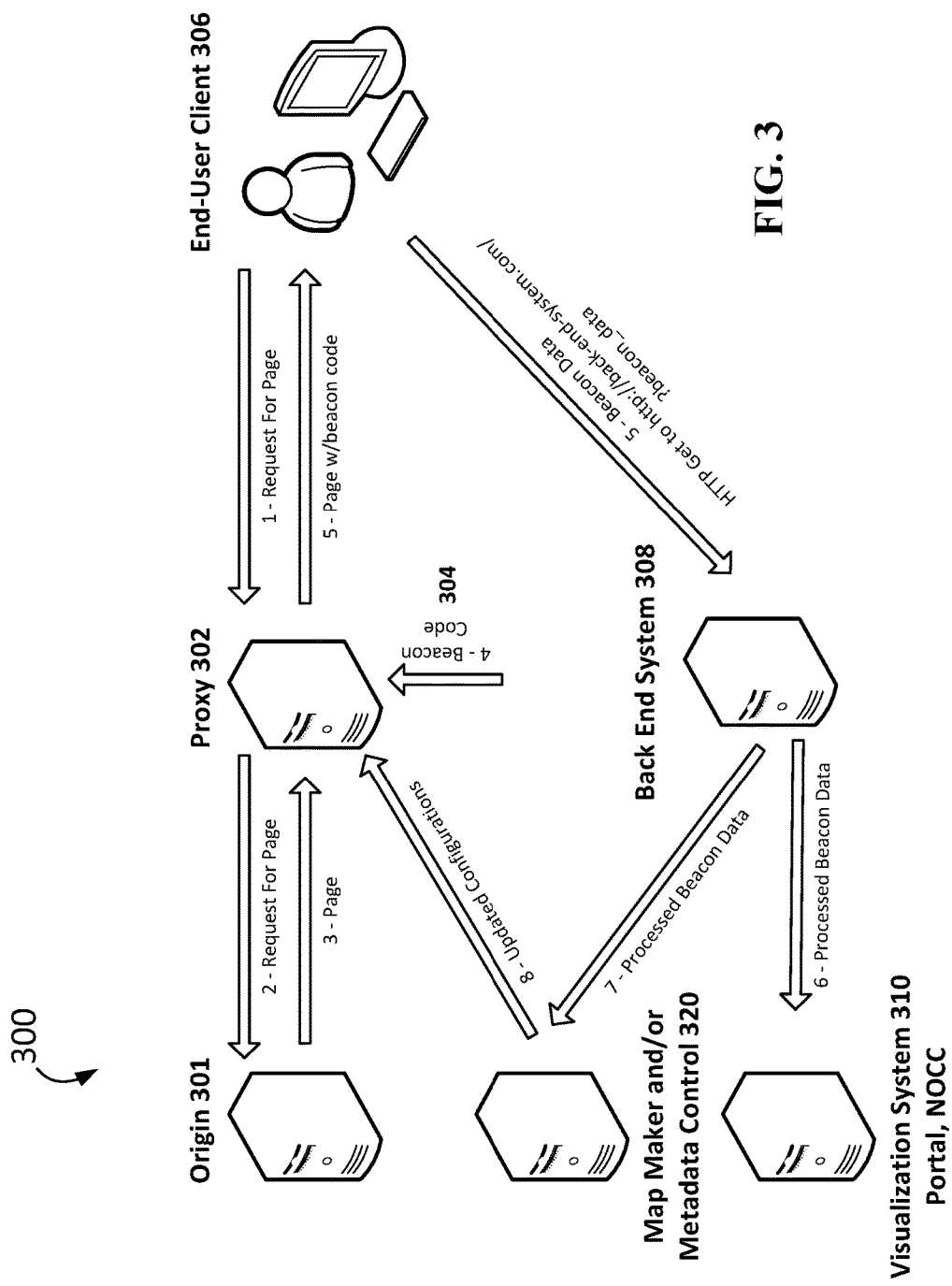
FIG. 3 is a schematic diagram illustrating one embodiment of a performance monitoring and measurement system for a CDN.

FIG. 3 illustrates, at a high-level, an embodiment of a performance measurement and monitoring system 300 which can be built as an overlay to the CDN shown in FIGS. 1-2. FIG. 3 shows an intermediary device 302, which is preferably (though without limitation) one of the machines 102 configured as a proxy server, as shown and described above with respect to FIGS. 1-2. Assume that the client 306—in this example a web browser 306 running on an end-user machine—has made a request (e.g., an HTTP 'Get' request) for a particular web page to the proxy server 302 after having been mapped to that proxy server via a DNS system lookup. The proxy server 302 obtains the page from the origin/source server 301, or from an internally cached copy that was previously retrieved. In the illustrated embodiment, the functionality of the proxy server 302 is extended to insert measurement code 304 into the web page (e.g., an HTML file, although other content and/or markup language file formats could be used) that was obtained by the proxy server 302 and is being delivered to the client application. The insertion of the code can be controlled and customized on a content provider by content provider basis (or even a page by page basis), using the metadata approach described previously. The code enables and facilitates the collection of performance data from within the client application and the reporting back of this data to the CDN. The CDN can then provide this information to content providers (e.g., through an extranet portal), report the information for internal use, and/or act on this information directly.

It should be noted that the insertion of code can be performed by any intermediary device, and is not limited to the example of CDN proxy servers, which are merely examples. The intermediary might be another device or a software module residing in the communication path between the content origin and the client. Moreover, the client can be any application and is not limited to a browser 306, though that is used herein for illustrative purposes.

In this embodiment, the inserted code 304 is preferably a small, relatively fixed body of JavaScript. This code will gather timing data and cause the browser 306 to send it back to the CDN as query string arguments on an http GET request, referred to herein as a beacon. In one embodiment the beacon is sent on a content-provider-controlled hostname; alternatively, the beacon can be sent to the hostname of the base page (the page on which the JavaScript is loaded), which will save a DNS lookup and a TCP connect in the common case.

As mentioned previously, a configuration (config) for how to deliver the beacon may be provided to the proxy server. In many cases, it is desirable to inline all the necessary JavaScript in the base page. However, if the base page grows too large, an alternative is to inline a script that asynchronously loads the main body of code. In this case a simple object-delivery configuration for delivering the browser-cacheable JavaScript to the end user from the proxy server is possible. Preferably, this will be on a provider-controlled hostname to avoid multiply caching the object at proxy server.

As shown in FIG. 3, there is also provided a back-end system 308 for receiving the beacons generated at the browser, producing download receipts, forwarding them to a processing engine, and inserting summary results into a database. Preferably, the download receipt contains the full beacon URL and client IP address. It should be appreciated that in many cases, the system can be set up so that the client 306 sends the data back to the server 302, which then relays it to the back-end system 308, since the server 302 may be closer to the client 306.

A visualization system 310 extracts data from the database on-demand and produces charts for display to participating content providers in the service provider extranet web portal.

A control system 302 can be used to process the performance information and identify and address performance issues affecting the operation and performance of the CDN platform. The system may identify, for example, that certain web page optimizations/treatments are causing a problem for a particular content provider or particular category of client (e.g., a client device running a particular browser). It might determine, by way of further example, that a particular set of end-user clients is receiving poor performance because certain proxy servers are functioning sub-optimally, or those proxy servers are being mapped to sub-optimal cache hierarchy parents, or those clients are being mapped sub-optimally to the proxy servers, or otherwise. Using this kind of information, new control information to address the performance issue, in the form of an updated configuration file for example, can be fed back to the proxy server 300 (or to another component of the CDN such as the mapmaker in FIG. 1).

2.0 Gathering Performance Data from Browsers

There are several ways for the inserted code 304 to access and collect performance data from the browser 306. JavaScript has some ability to gather performance data; for example, there are universally-supported hooks for millisecond-granularity timers and for registering a function that gets executed when the browser considers the page to be fully loaded (e.g., the "onload" event). This allows, for example, the inserted code to grab a timestamp as the first step in the <head> section of a page, grab another when the onload event fires, and compute the difference. This does not capture network time (DNS, connect, first-byte), however, and is dependent on browser operation with regards to the firing of the onload event.

Browsers have varying abilities to gather more detailed data. Many different techniques are available to capture the point in time at which a page becomes "ready" for use by the end-user, and to capture estimates of network time. These techniques are generally browser-specific and known to those skilled in the art. Many of them have been incorporated into general-purpose libraries like jQuery and Boomerang.

Browsers that are compliant with W3C Navigation Timing (referred to herein as "NavTiming") or Resource Timing (referred to herein as "ResTiming") specifications offer another option for gathering performance data. These specifications describe a framework via which a browser can directly export page timing data. These specifications specify a framework via which a browser can export timing data about the base page and about embedded objects. As those skilled in the art will appreciate, more information about the specifications can be found at the W3C website.

From the browser's point of view, an HTTP request for a page can be broken into a series of phases: Prompt for unload, Redirect, App cache, DNS, TCP, Request, Response, Processing, and onLoad. A browser implementing the Navigation Timing specification makes available a timestamp (milliseconds since the epoch) at a variety of points in each phase, including the start and stop time of each phase. Notably, five distinct timestamps are made available during the "Processing" phase of the transaction: start time, the time at which the page becomes interactive to the user, the time at which the browser fires the content-loaded event, the time at which the content-loaded event completes, and the time at which the document object model (DOM) is complete in memory. The specification provides more precise definitions for all these events.

The Resource Timing specification provides timing data for each embedded object on a page. The timing data can include a variety of timestamps (including start and stop times) for the phases of Redirect, App Cache, DNS, Request, Response. The level of detail in the Resource Timing specification is available only when the server sending the embedded object includes a particular response header with that object. In the absence of that header, the browser makes available only the end-to-end timing for each embedded object. With a content provider's permission, however, a CDN proxy server can insert the header on any CDN-directed object on a hostname controlled by the same content provider as the base page.

The data available through the Navigation Timing/Resource Timing-compliant browsers may not correlate exactly to that obtained through other approaches described above. Therefore, preferably the system 300 displays results from Navigation Timing data separately from non-Navigation Timing data.

3.0 Implementation

This section describes example implementations of the system components.

3.1 Beacon

The inserted code (a snippet of JavaScript in the current example) supports data collection in the case where NavTiming is present in the browser and the case where it is absent. In the former case the JavaScript does nothing more than to collect up the data and send it back to the service provider. In the latter, the JavaScript can grab a timestamp at the beginning and the end of the page and at the DOMContentLoaded event (where supported), and optionally execute an asynchronous fetch of a small test object from the edge. The back-end 308 will use the timing of the test object fetch to infer the round trip time between the browser and the proxy server, as observed by the browser.

3.1.1 Wrapper

"asbw" (Site Beacon Wrapper) is several lines of code whose function is to download the main body of the JavaScript (sitebeacon.js) in a way that minimizes performance impact on the content provider page. It does this by creating a new script element and adding it to the DOM, which allows the script to be fetched in parallel with other page activity. This code also grabs a timestamp used when NavTiming is not available. This approach is used if it is infeasible to inline the main body of the data collection script.

If used, this body of code can be inlined directly as the first element of the <head> section in the content provider page.

3.1.2 Site Beacon

Sitebeacon.js supports both the NavTiming and non-NavTiming cases. Support for NavTiming can be inferred by the proxy server from the User Agent header sent by the client 306 with the request. There may be one script for NavTiming and one for Non-NavTiming browsers. The code attaches a function to the onload event. When that function executes it determines whether NavTiming is available, and if so collects a subset of the timing data. When NavTiming is not available the script computes DOMContentLoaded and the onload event timestamps, and then optionally fetches a small test object from the same hostname. The back-end will use the elapsed time of the fetch as an estimate of the round trip time (RTT) to the proxy server. In either case, the JavaScript sends the data to the back-end system 308 via query strings on an HTTP 'Get' request. It uses a detached <image> tag for this send, so no cross-domain restrictions are imposed by JavaScript.

3.1.3 Beacon Data

The beacon payload may vary, but for illustrative purposes, an example of a base set of information to be carried is tabulated below. All the NavTiming data is expressed as the delta in milliseconds between the domainLookupStart timestamp and some other NavTiming timestamp. Absolute timestamps can be used, but are not preferred since they are based on the end-user's clock. To use absolute timestamps, though, the raw domainLookupStart time can be sent back, in addition to the other data. The NT column indicates whether or not the datum is derived from the NavTiming data, which clarifies what data would be received from non-NT browsers. All integers are signed in this implementation. The back-end 308 can discard malformed data such as strings in the integer columns or strings of excessive length.

| FIELD | TYPE | EXPRESSION | NT | MEANING |
| --- | --- | --- | --- | --- |
| dnsE | Int | domainLookupEnd-domainLookupStart | Y | DNS lookup time |
| conS | Int | connectStart-domainLookupStart | Y | Connect start time |
| sslS | Int | secureConnectionStart-domainLookupStart | Y | SSL start, blank for http |
| conE | Int | connectEnd-domainLookupStart | Y | Connect end time |
| reqS | Int | requestStart-domainLookupStart | Y | Request start time |
| respS | Int | responseStart-domainLookupStart | Y | Response start time |

-continued

| FIELD | TYPE | EXPRESSION | NT | MEANING |
|---|---|---|---|---|
| respE | Int | responseEnd-domainLookupStart | Y | Response end time |
| domL | Int | domLoading-domainLookupStart | Y | DOM Loading time |
| domI | Int | domInteractive-domainLookupStart | Y | DOM Interactive time |
| domCLS | Int | domContentLoadedEventStart-domainLookupStart | Y | DOM CL event start |
| domCLE | Int | domContentLoadedEventEnd-domainLookupStart | Y | DOM CL event complete |
| domC | Int | domComplete-domainLookupStart | Y | DOM Complete time |
| leS | Int | loadEventStart-domainLookupStart | Y | Onload event start time |
| leE | Int | loadEventEnd-domainLookupStart | Y | Onload event done time |
| dclE | Int | Measured DOMContentLoaded - head start | N | Time to DOMContentLoaded event7 as measured by js |
| plt | Int | Measured onload start - head start | N | Page Load Time as measured by js |
| testo | Int | Measured testobj end - testobj start | N | Test object fetch time |
| plat | String | navigator.platform | N | Platform string from BOM |
| ua | String | navigator.userAgent | N | User Agent string from BOM |
| uri | String | location.href | N | Full URI of base page |
| hs | Int | Constant set by metadata | N | HTTP Status code for base page |
| ver | String | Constant set by metadata | N | Beacon version number |

3.2 Beacon Rate Control

The design described herein gives control over the beacon insertion rate to the content provider or the service provider. The insertion rate is controlled because the beacon has the potential to impact page performance and so the content provider will likely want to restrict it to a fraction of all page loads. Further, the beaconed data has the capability of overwhelming the back-end system 308 with data; restricting the insertion rate is a way to control load on the back-end system 308.

Rates can be set depending on the page being delivered, the type of client device (e.g., OS, browser, device type such as mobile) requested the page. Beacon insertion rates may also be controlled by whether or not the proxy server is applying some feature (e.g., a web content optimization) to the page.

3.3 Configuration and Insertion of the Code

Edge node-supported code is used to insert the body of asbw.js immediately after the <head> tag in the page markup language.

The extranet portal can have a section that configures the metadata to conditionally insert the JavaScript. The portal can have a configuration page that allows the content provider to control the following:

- A method for selecting pages into which the beacon should be inserted. It can support controls by filename, path, and extension.
- For each such URL/path/extension, three distinct rate controls: NavTiming-enabled browsers, other Browsers, and mobile devices. For each of these the content provider can specify the percentage of all page views that should receive the JavaScript.
- When the rate control for non-NavTiming data is nonzero, the content provider can optionally specify a test object to be fetched from JavaScript asynchronously to the page load, for purposes of estimating the round trip time (RTT). If none is specified, none will be fetched and no RTT data will be available. When an object is specified the portal will add metadata that configures this object to return an empty body via a construct-response with status code 200. This avoids data pollution in the case when the test-object fetch takes a cache miss. The portal can suggest a test object name by pre-filling the form field with a file that is unlikely to conflict with any actual object, such as http://<hostname>/CDN_test_object_for_rum.txt.

Configuration might be controlled on many parameters beyond those above: cookies, A/B testing, specific browser types, geographies, and so on.

Figure 4:
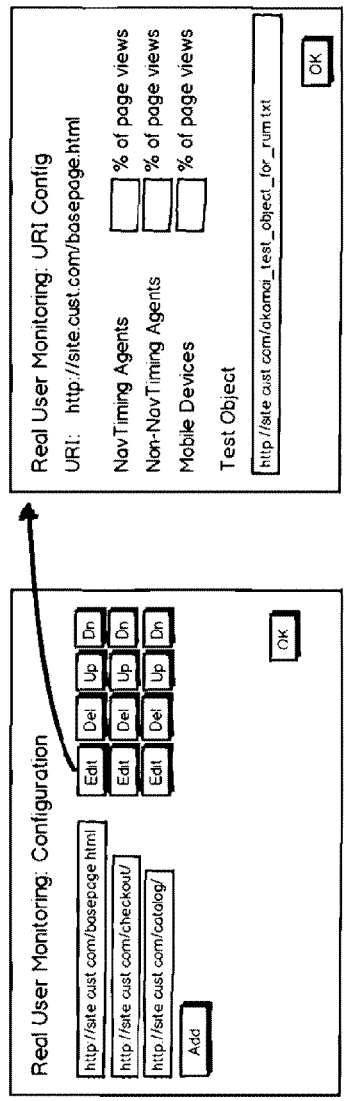
FIG. 4 is a schematic diagram illustrating one embodiment of a user interface for a web portal for configuring and otherwise interacting with the system.

For illustration (only), FIG. 4 is a wireframe of what a web-based user interface might look like in the portal.

From this (and again only for illustration), the configurator might generate metadata control information that looks like the following pseudo-code:

```
<match file type is html>
<match response status is 2xx>
<set-variable RATE=0>
<match path matches lowest-numbered-path>
<match:devicecharacteristic NavTiming result="false"> <set-variable RATE=X> </match>
<match:devicecharacteristic NavTiming result="true"> <set-variable RATE=Y> </match>
<match:devicecharacteristic MobileDevice> <set-variable RATE=Z>
</match>
</match>
[ Repeat the above block for each configured path, in order ]
<match random( ) less-than RATE>
<edgecomputing:akamaizer.tag-filter>
<rule>#(& lt;head& gt;)# [ body of js to insert ] #</rule>
</edgecomputing:akamaizer.tag-filter>
</match>
</match>
</match>
```

In a preferred embodiment, the system maintains a base rate of beacon insertion and then for certain content-provider-specified categories of traffic, it increases the insertion rate so as to ensure the sample size of data for those categories is sufficiently large to be useful (e.g., high resolution, statistically significant) in performance analyses. To accomplish this, in one embodiment the system activates the beacon insertion function on all pages of a content provider's site, except for a set of pages that the content provider can optionally specify to be excluded. As the CDN serves pages to clients, the system maintains the beacon insertion rate within certain bounds. Since the CDN is serving the pages to end-user clients, the CDN knows the historical page-request rate and the capacity of the back-end system 308 to handle the performance data that will be sent by the beacons. The CDN can use these two pieces of information set the beacon insertion rate within acceptable bounds, e.g., so that the back-end 308 is not overwhelmed. Through the portal, the content-provider can specify that particular traffic categories of interest (e.g., certain geographies, browsers, feature sets, etc.), and the CDN can increase the beacon insertion rate for those categories. For example, as a given proxy server 302 in the CDN fields client requests, it will determine whether a given request falls within a particular category (e.g., by mapping client IP address to geography, by examining the user-agent header to determine browser or other client device characteristic, or any such technique known in the art). For requests falling within the category, the proxy server 302 inserts beacons at a particular rate 'N'. For requests falling outside the category, the proxy server 302 inserts beacons at another rate 'M', which would usually be lower than 'N'.

3.4 Delivery of Sitebeacon.js

The configuration that delivers sitebeacon.js to the browser is an object delivery service of the CDN service provider.

3.5 Back-End

In the current embodiment, an infrastructure (servers, databases, software, APIs, and so forth) is used for receiving beacon data generated from end-user clients 306. The beacon data is sent from the browser by executing an http GET on a hostname private to the company collecting the data; that hostname points to the back-end 308. The configuration validates any associated authentication token and sends a download receipt to additional back-end infrastructure, where it is consumed by a processing engine that writes the data to a database.

3.6 Visualization

Recall the wireframe diagram of the configuration page shown in FIG. 4. Clicking on one of the paths can take the end-user to the visualization console for that path.

The visual layout of the console might include a set of tabs via which various different graphs can be selected. The interface preferably supports the metrics listed below, in one embodiment. In each case, the portal user can have the option of selecting subsets of these parameters to be displayed on the same graph, and of saving that report definition for future use.

Figure 5:
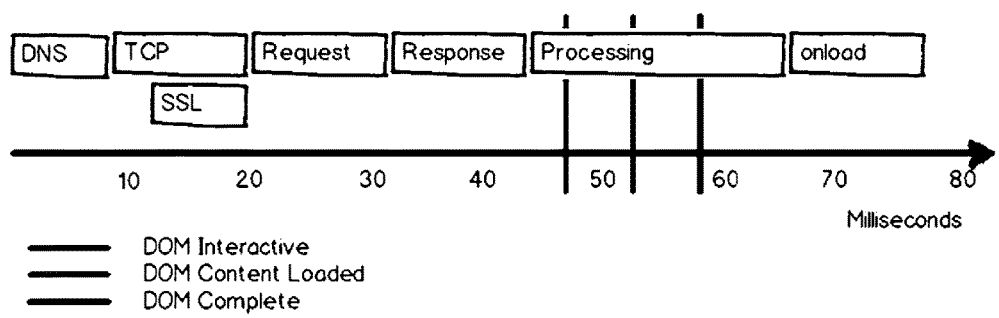
FIG. 5 is a schematic diagram illustrating one embodiment of NavTiming page load phase breakdown, as it might appear in the portal.

NavTiming average page-ready timing data: A graph giving average values for page-ready timing metrics that the customer might be interested in. These will be line graphs with time on the X axis. Some parameters of interest are:
    End-to-end time: defined as loadEventEnd—domainLookupStart
    Onload event time: loadEventStart—domainLookupStart
    DOM complete time: domContentLoadedEventStart—domainLookupStart
    Page interactive time: domInteractive—domainLookupStart
    Download compete time: responseEnd—domainLookupStart
  NavTiming 90th percentile page-ready timing data: the same graph as above, calculating the 90th percentile values of the metrics rather than the averages.
  Non-NavTiming average page-ready timing data: A graph with time on the X axis and three lines:
    Onload event time: elapsed time from the first execution of inlined JavaScript to the onload event
    DOMContentLoaded time: elapsed time from the first execution of inlined JavaScript to the DOMContentLoaded event, if any such data exists
    Estimated round trip time from client to edge proxy: elapsed time to fetch the test object, if any such object has been configured
  Non-NavTiming 90th percentile page-ready timing data: the same graph as above, calculating 90th percentile values of the metrics rather than averages.
  Sample counts: a count of the number of samples that went into the plots being displayed, for both NavTiming and non-NavTiming plots, as specified by the current filter.
  NavTiming page load phase breakdown: a graphic showing the average values for the components of the HTML transfer, as shown in FIG. 5.

The infrastructure provides support for reporting and viewing the data by population group rather than globally. All of the visualizations mentioned in the above section may be available broken down along the following axes:
  Country-level geography, and/or state- or metro-area-level.
  Connection speed category
  Connection type (e.g. cable, DSL, mobile)
  Platform (e.g. iPhone, Android, Windows, Linux_x64) as returned in the platform field of the beacon data.
  Browser+version (e.g., IE9), or just browser (e.g., IE), or if neither of those is possible, User Agent.

Each of these can be selected independently of the others, making all combinations possible.

4.0 Custom Beacon Fields

The utility of the system 300 can be extended by enabling the insertion of certain custom fields into the beacon code for reporting back with the beacon data, for use by the visualization system 310 or the mapping/control system 320 of the CDN. For example, the proxy server 302 can be configured to construct a variable indicating some information of interest, and the value could be inserted into the page with the JavaScript block in the <head> section, and subsequently collected along with the NavTiming or other data and sent to the back-end. The back-end 308 would recognize it as a custom field and automatically produce visualizations computed over the data on each branch of the test. The value might indicate a wide variety of information relating to the content delivery process, such as:

What web content optimizations the proxy server 302 applied to the page. As previously described (and as noted in U.S. Publication No. 2011/0314091), a wide variety of performance-enhancing modifications can be automatically applied to a page (or other content). Specific examples of such treatments include in-lining content, resource consolidation, minification, image optimization, domain sharding, version control for cacheability, just-in-time loading, adjusting the time at which page scripts are run, device-adaption modifications, and so on. Other treatments might involve compression and/or de-duplication of content. The proxy server can embed identifiers in the beacon to indicate what content optimization treatments it applied to the page, or more generally, what features of the server and CDN (e.g., possibly corresponding to products offered by the CDN) were engaged when processing the page. The resulting data can be interpreted and visualized to indicate the effect of particular optimizations/features and combinations thereof on each page of a content provider.
  What version of a page was selected and delivered by the proxy server 302. Thus the variable could indicate whether an A or B side of a test was executed at any given page load.

Information relating to the proxy server 302, the CDN platform, and/or delivery circumstances. For example, the information can include an identifier for the given proxy server, or for the CDN region or point-of-presence of the CDN within which the proxy server resides. Further, information about where the proxy server 302 fetched the page (e.g., from local cache, from a particular cache-hierarchy parent or PoP, from NetStorage, or from a content-provider-managed-origin server, etc.) Note that this information might also reflect where the proxy server 302 has or will fetch embedded objects on the page, and thus be useful in assessing performance related to the delivery of embedded objects. The information might also identify which intermediate nodes within the CDN are being used for routing content (the page or the embedded objects) to the proxy server for delivery to the client. The resulting data can be interpreted and visualized to indicate whether certain servers or clusters or network functions are presenting performance issues. The data can also be sliced to focus on particular clients or categories of clients (e.g., certain browsers, mobile devices, etc.).

Information relating to the client and/or determined from the client's request. In addition to client IP address and other client identifiers, information derived from client request headers can be included in the beacon. Examples include a determination of geography based on client IP address, and a determination of client device identity or characteristics based on, e.g., the user agent. In the latter case, the proxy server can run an edge device identification module that ingests the user agent given by the client with its initial request for content, and based thereon returns a client device identifier (i.e., which may be an identifier internal to the CDN) and/or characteristics of the device like operating system, physical dimensions, etc. The resulting performance data can be interpreted and visualized to indicate the performance (or lack thereof) for certain clients or categories thereof.

To enable the insertion of custom values, the proxy server's request processing function may expose internally what features it had applied to any given page load. The server could include these variables as internal uses of the custom beacon fields feature.

Visualization based on these fields can be made available to network operations personnel (e.g., in the NOCC) as well as content providers on the portal. The information can be used to validate the effect of features, to make recommendations about configuration of the features that the content provide has signed up for, and/or making changes to the content itself, to improve performance.

5.0 Conversion Rate Tracking

In a further embodiment, the system 300 can be extended beyond performance and into conversion rates. The portal could allow commerce content providers to specify that certain URLs or combinations of URLs indicate that a conversion event (e.g., an online sale) occurred, and the visualization system might give feedback on conversion rates as a function of performance or as a function of certain CDN features.

6.0 Use of Computer Technologies

The clients, servers, and other computer devices described herein may be implemented with conventional computer systems, as modified by the teachings hereof, with the functional characteristics described above realized in special-purpose hardware, general-purpose hardware configured by software stored therein for special purposes, or a combination thereof.

Software may include one or several discrete programs. A given function may comprise part of any given module, process, execution thread, or other such programming construct. Generalizing, each function described above may be implemented as computer code, namely, as a set of computer instructions, executable in one or more processors to provide a special purpose machine. The code may be executed using conventional apparatus—such as a processor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 6:
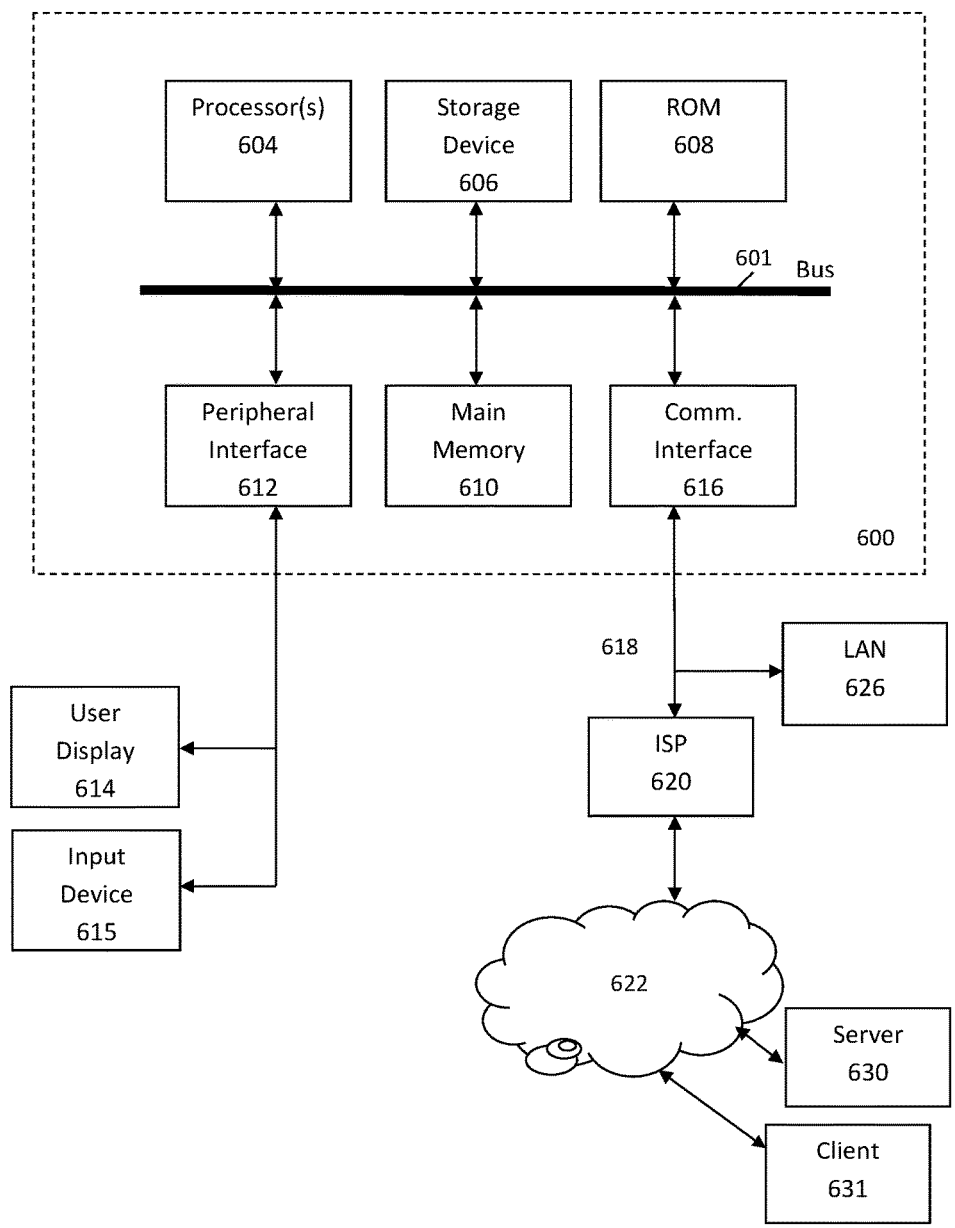
FIG. 6 is a block diagram illustrating hardware in a computer system that may be used to implement the teachings hereof.

FIG. 6 is a block diagram that illustrates hardware in a computer system 600 upon which such software may run in order to implement embodiments of the invention. The computer system 600 may be embodied in a client, server, personal computer, workstation, tablet computer, wireless device, mobile device, network device, router, hub, gateway, or other device.

Computer system 600 includes a processor 604 coupled to bus 601. In some systems, multiple processor and/or processor cores may be employed. Computer system 600 further includes a main memory 610, such as a random access memory (RAM) or other storage device, coupled to the bus 601 for storing information and instructions to be executed by processor 604. A read only memory (ROM) 608 is coupled to the bus 601 for storing information and instructions for processor 604. A non-volatile storage device 606, such as a magnetic disk, solid state memory (e.g., flash memory), or optical disk, is provided and coupled to bus 601 for storing information and instructions. Other application-specific integrated circuits (ASICs), field programmable gate arrays (FPGAs) or circuitry may be included in the computer system 600 to perform functions described herein.

Although the computer system 600 is often managed remotely via a communication interface 616, for local administration purposes the system 600 may have a peripheral interface 612 communicatively couples computer system 600 to a user display 614 that displays the output of software executing on the computer system, and an input device 615 (e.g., a keyboard, mouse, trackpad, touchscreen) that communicates user input and instructions to the computer system 600. The peripheral interface 612 may include interface circuitry and logic for local buses such as Universal Serial Bus (USB) or other communication links.

Computer system 600 is coupled to a communication interface 616 that provides a link between the system bus 601 and an external communication link. The communication interface 616 provides a network link 618. The communication interface 616 may represent an Ethernet or other network interface card (NIC), a wireless interface, modem, an optical interface, or other kind of input/output interface.

Network link 618 provides data communication through one or more networks to other devices. Such devices include other computer systems that are part of a local area network (LAN) 626. Furthermore, the network link 618 provides a link, via an internet service provider (ISP) 620, to the Internet 622. In turn, the Internet 622 may provide a link to other computing systems such as a remote server 630 and/or a remote client 631. Network link 618 and such networks may transmit data using packet-switched, circuit-switched, or other data-transmission approaches.

In operation, the computer system 600 may implement the functionality described herein as a result of the processor executing code. Such code may be read from or stored on a non-transitory computer-readable medium, such as memory 610, ROM 608, or storage device 606. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 618 (e.g., following storage in an interface buffer, local memory, or other circuitry).

What is claimed is:

1. Computer apparatus, comprising:
   A. a network interface for receiving requests for markup language files from clients over a network;
   B. circuitry forming one or more processors and memory holding instructions to be executed by the one or more processors to cause the computer apparatus to respond to the requests by:
      i. for a first set of client requests for a first markup language file:
         a) obtaining the first markup language file from any of a source computer and a local cache that stores a copy of the first markup language file previously obtained from the source computer;
         b) for only a first proportion of the first set of client requests, inserting code into the first markup language file for execution by the client when processing the first markup language file, wherein execution of the code will cause the client to gather timing information about the client's processing of the first markup language file and transmit the timing information over the network to any of the computer apparatus and another computer; and,
         c) sending the first markup language file with the inserted code to the client;
      ii. for a second set of client requests for a second markup language file:
         a) obtaining the second markup language file from any of the source computer and a local cache that stores a copy of the second markup language file previously obtained from the source computer;
         b) for only a second proportion of the second set of client requests, inserting code into the second markup language file for execution by the client when processing the second markup language file, wherein execution of the code will cause the client to gather timing information about the client's processing of the second markup language file and transmit the timing information over the network to any of the computer apparatus and another computer; and,
         c) sending the second markup language file with the inserted code to the client;
   C. wherein the first set of requests corresponds to requests falling within a traffic category specified by a provider of the first and second markup language files, and the second set of requests corresponds to requests falling outside of the traffic category;
   D. wherein the traffic category is defined by whether the computer apparatus is applying a particular web content optimization to a requested markup language file after obtaining the requested markup language file from the source computer, the particular web content optimization being distinct from the insertion of code into the requested markup language file and comprising a performance-enhancing modification to the requested markup language file made by the computer apparatus.

2. The computer apparatus of claim 1, wherein the first proportion is higher than the second proportion.

3. The computer apparatus of claim 1, wherein the traffic category further corresponds to any of: client requests from particular geographies, client requests from clients running particular client applications, client requests from clients running particular client browsers.

* * * * *